(12) United States Patent
Mallet et al.

(10) Patent No.: US 7,743,392 B2
(45) Date of Patent: *Jun. 22, 2010

(54) SYSTEM AND METHOD FOR PARALLEL ASYNCHRONOUS EXECUTION OF COMMANDS

(75) Inventors: Alexander E. Mallet, Bellevue, WA (US); Justin Grant, Seattle, WA (US); Michael W. Thomas, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/318,382

(22) Filed: Dec. 23, 2005

(65) Prior Publication Data

US 2006/0101475 A1    May 11, 2006

Related U.S. Application Data

(63) Continuation of application No. 09/545,647, filed on Jun. 16, 2000, now Pat. No. 6,981,267.

(51) Int. Cl.
*G06F 9/44* (2006.01)
(52) U.S. Cl. ...................... 719/330; 719/318
(58) Field of Classification Search ................ 719/310, 719/315, 316, 318, 328, 330; 709/202, 203
See application file for complete search history.

(56) References Cited

U.S. PATENT DOCUMENTS

| | | | |
|---|---|---|---|
| 5,491,800 A | 2/1996 | Goldsmith et al. | |
| 5,822,585 A | 10/1998 | Noble et al. | |
| 5,857,201 A | 1/1999 | Wright, Jr. et al. | |
| 5,864,665 A * | 1/1999 | Tran | 726/10 |
| 5,875,306 A | 2/1999 | Bereiter | |
| 5,887,172 A * | 3/1999 | Vasudevan et al. | 719/328 |
| 5,951,653 A | 9/1999 | Hill et al. | |
| 6,016,516 A * | 1/2000 | Horikiri | 719/330 |
| 6,108,715 A | 8/2000 | Leach et al. | |
| 6,223,217 B1 | 4/2001 | Pettus | |
| 6,226,689 B1 | 5/2001 | Shah et al. | |
| 6,275,871 B1 * | 8/2001 | Reinfelder et al. | 719/328 |
| 6,324,542 B1 | 11/2001 | Wright, Jr. et al. | |
| 6,339,783 B1 * | 1/2002 | Horikiri | 709/203 |
| 6,446,137 B1 * | 9/2002 | Vasudevan et al. | 719/330 |
| 6,529,962 B1 | 3/2003 | Azagury et al. | |
| 6,546,425 B1 | 4/2003 | Hanson et al. | |
| 6,633,923 B1 * | 10/2003 | Kukura et al. | 719/316 |
| 6,691,151 B1 * | 2/2004 | Cheyer et al. | 709/202 |

(Continued)

OTHER PUBLICATIONS

Lin et al. "An Asynchronous Remote Procedure Call System For Heterogeneous Programming", 1991 IEEE, pp. 153-159.*

(Continued)

*Primary Examiner*—Van H Nguyen
(74) *Attorney, Agent, or Firm*—Workman Nydegger

(57) ABSTRACT

A system for parallel asynchronous command execution is provided. The system includes a first computer system for directing a plurality of calls to at least one other computer system. The first computer system invokes a remote procedure in the other computer system and receives results from the procedure via an event triggered by the other computer system. The system may also include a distributed object architecture for communicating between the first computer system and the other computer system.

20 Claims, 6 Drawing Sheets

U.S. PATENT DOCUMENTS 6,760,903 B1    7/2004    Morshed et al.

OTHER PUBLICATIONS

Welling et al. "An Architecture Of A Threaded Many-To-Many Remote Procedure Call", 1992 IEEE, pp. 504-511.*

Lin et al. "Reusing MS-Windows Software Applications Under CORBA Environment", 1998 IEEE, 8 pages.*

T. Oka, et al., "Designing Asynchronous Parallel Process Networks for Desirable Autonomous Robot Behaviors", Proceedings of the 1996 IEEE/RSJ International Conference on Intelligent Robots and Systems, IROS 96, Robotic Intelligence Interacting with Dynamic Worlds, 1996, p. 178-185, vol. 1.

F. De Turck, et al., "On the Design and Implementation of a Hierarchical, Generic and Scalable Open Architecture for the Network Management Layer", NOMS 2000, 2000 IEEE/IFIP Network Operations and Management Symposium, 'The Networked Planet: Management Beyond 2000', p. 745-758.

P. Olivier, et al. "An Asynchronous Distributed Access Control Architecture for IP over ATM Networks", 1999, p. 1-9.

\* cited by examiner

SYSTEM AND METHOD FOR PARALLEL ASYNCHRONOUS EXECUTION OF COMMANDS

CROSS-REFERENCE TO RELATED APPLICATIONS

This application is a continuation of U.S. application Ser. No. 09/545,647 filed Jun. 16, 2000 now U.S. Pat. No. 6,981,267, issued Dec. 27, 2005, and entitled, "SYSTEM AND METHOD FOR PARALLEL ASYNCHRONOUS EXECUTION OF COMMANDS." The entirety of the aforementioned application is incorporated herein by reference.

TECHNICAL FIELD

The present invention relates generally to computer systems, and more particularly to a system and method for executing asynchronous cluster commands in a distributed network environment.

BACKGROUND OF THE INVENTION

As computing systems have become more dependent on network communications, system performance requirements have increasingly become more demanding. Many of these requirements are related to distributed system architectures wherein a first system, such as a client, may need to invoke remote command execution on one or more other systems such as server systems. In many instances, it is desirable to execute a plurality of commands on multiple servers concurrently—without having to wait for a command to complete on one server before moving to the next server. Waiting becomes even more important when commands require substantial time to complete. Unfortunately, conventional system architectures do not provide an acceptable interface to enable remote commands to execute substantially in parallel without undue delay. Thus, remote command performance needs to be improved in order to meet and/or exceed the challenges presented by modern distributed systems.

Another challenge associated with remote command execution is related to command execution during and/or after a disruption in communications between the client and the server. The disruptions may be caused by network problems (e.g., intermittent connection) or may be hardware/software related whereby a server must be rebooted because of a system crash. In some instances, system commands may cause a disruption in network communications. For example, when an IP address is added to a network card, all existing TCP connections for that card may be dropped. Network disruptions, as described above, will likely present a problem for conventional architectures. If the command were executed as part of a conventional remote procedure call, then the procedure will likely fail in the event of a disruption since these processes rely on TCP connections remaining open for the duration of the call.

Some attempts have been implemented to try and address the above problems. One approach involves splitting the remote procedure calls into two method invocations—a "Begin" and "Finish" invocation. In a Begin invocation, input parameters are sent to the method without waiting for the execution of the actual call. When the caller desires to retrieve the results of the invocation, the Finish invocation is called wherein output parameters of the method may be filled in with the result of the execution. Although concurrent execution of commands may be provided by the Begin and Finish invocation, other problems are still unresolved. For example, two separate versions of the interface for the Begin and Finish invocation must be provided in order to execute the method—a synchronous and asynchronous version. Secondly, the client must explicitly request for the results of the remote method invocation and risk blocking if the execution is not completed.

Another attempt to address the above problems has involved the utilization of callback pointers wherein the client is required to pass a callback pointer in the method invocation. Upon receipt of the call, a server may spin a new thread, then pass the callback pointer to the thread and return. The new thread may then call the client back on the supplied callback pointer when processing is complete. However, this interface may fail if the server calls back on an interface pointer that is no longer valid due to the client shutting down and/or crashing. Additionally, significant overhead is involved with callback pointers since these pointers must be marshaled across various processes, machines and threads.

Unfortunately, neither of the above implementations solve the problem caused by network connections being reset as part of the remote command invocation since both implementations substantially rely on persistent and/or continuous network connections remaining available during remote command execution.

SUMMARY OF THE INVENTION

The present invention relates to a system and method for executing parallel asynchronous commands in a multiple services environment. In accordance with the present invention, a plurality of commands may be concurrently executed without waiting for the status and result of the command to be received. This enables a process to complete even if a network connection is reset and/or temporarily disabled during remote command invocation. In contrast to conventional systems which may rely on persistent (e.g., continuous) connections being available during command execution, the present invention may remotely invoke execution on a first system, and receive completed results on a second system at a later time—without the need for persistent handshaking to complete execution. Thus, command execution may start and then complete after a disruption in network communications.

More specifically, the present invention provides a distributed object architecture that is managed via a thread pool of concurrently executable objects. Remote completion of a command may then be signaled via an event fired from a remote machine. A remote invocation of a command may be started by calling the distributed object, and notification/results of the completion of the invocation may then be received as a result of the event fired from the remote machine. When a first system (e.g., client) makes a command call to the remote machine, the call returns before execution actually begins. Thus, a plurality a remote commands may be executed in rapid succession. The first system may then release an interface pointer after making the initial command calls since notification of the calls is provided from the remote machine by the event. This mitigates the problem of a server calling back on an interface pointer that may no longer be valid due to a client being shut down and/or crashed. Moreover, overhead associated with marshalling interface pointers across different processes, machines, and threads is mitigated.

According to another aspect of the present invention, system upgradability and flexibility may be improved by enabling a system to receive new functionality without disturbing and/or requiring existing system components to change. This may be achieved by implementing an interface in accordance with the present invention, passing input data to the interface in the form of a string and marshalling output data into an output argument to be received by the interface.

In accordance with another aspect of the present invention, a system is provided for parallel asynchronous command execution. The system includes a first computer system for directing a call to invoke a remote procedure in a second computer system, wherein the first computer and second computer communicate via a non-persistent connection. The second computer system upon completion of the remote procedure generates an event trigger and transmits the event trigger and remote procedure results to the first computer.

According to yet another aspect of the present invention, a system is provided for parallel asynchronous command execution. The system includes a first computer system for directing at least one call to invoke a remote procedure in at least one other computer system, the at least one other computer system upon completion of the remote procedure establishing a non-persistent connection to the first computer system, the at least one other computer system generating an event trigger and transmitting the event trigger and remote procedure results to the first computer.

According to another aspect of the present invention, a methodology is provided for parallel asynchronous command execution. The methodology includes the steps of: directing at least one call from a first computer system to invoke a remote procedure in at least one other computer system; establishing a non-persistent connection between the first computer system and the at least one other computer system upon completion of the remote procedure; and generating an event trigger and transmitting the event trigger and remote procedure results to the first computer.

In accordance with another aspect of the present invention, a system is provided for parallel asynchronous command execution. The system includes means for directing at least one call from a first computer system to invoke a remote procedure in at least one other computer system and means for establishing a non-persistent connection between the first computer system and the at least one other computer system upon completion of the remote procedure. The system also includes means for generating an event trigger and transmitting the event trigger and remote procedure results to the first computer system.

Another aspect of the present invention includes a system for parallel asynchronous command execution. The system includes a server for responding to at least one remote call by invoking a remote procedure, the server establishes a non-persistent connection to communicate results of the remote procedure, and the server generates an event trigger and transmits the event trigger and remote procedure results upon completion of the remote procedure.

According to another aspect of the present invention, a system for parallel asynchronous command execution is provided. The system includes a first computer for directing a call to invoke a remote procedure in a second computer, the first computer transmits a non-persistent signal to the second computer, wherein the second computer upon completion of the remote procedure generates an event trigger and transmits the event trigger and remote procedure results to the first computer via the signal.

In accordance with yet another aspect of the present invention, a computer-readable medium is provided having computer-readable instructions for performing the acts of:

responding to at least one remote call by invoking a remote procedure; establishing a non-persistent connection to communicate results of the remote procedure; and generating an event trigger and transmitting the event trigger and remote procedure results upon completion of the remote procedure.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
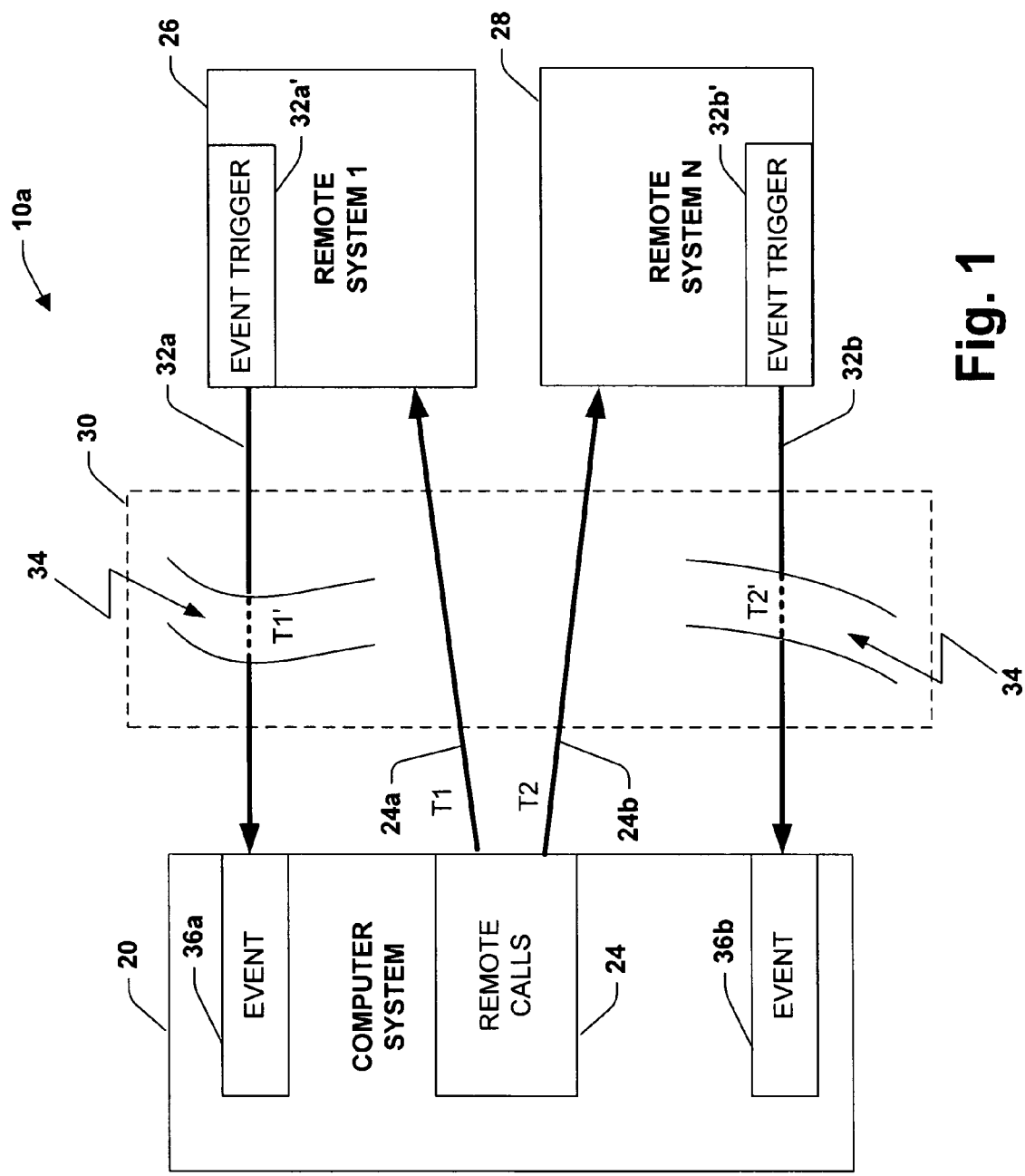
FIG. 1 is a schematic block diagram illustrating a system for parallel remote command execution in accordance with one aspect of the present invention.

The present invention is now described with reference to the drawings, wherein like reference numerals are used to refer to like elements throughout.

In accordance with the present invention, a system and method is provided for executing concurrent asynchronous cluster commands—even if network connections are disrupted after being reset as part of remote command invocation. Commands may execute without waiting for previously initiated commands and do not rely on persistent network connections being available during command invocation. Thus, by enabling commands to be fired in rapid succession and by further enabling command completion after network disruptions have occurred, substantial performance improvements are achieved over conventional systems.

Moreover, the present invention provides an extensibility mechanism for adding desired functionality to a system and/or system cluster without disrupting existing system functionality. Extensibility is especially important in distributed systems wherein it may be infeasible to upgrade all nodes at once. Consequently, new system functionality may need to be introduced in a phased manner.

Referring initially to FIG. 1, a system 10a illustrates a particular aspect of the present invention relating to asynchronous execution of commands in a network environment. A first computer system 20 may direct a plurality of remote calls 24 to a plurality of remote systems 26 and 28. For example, remote system 1 (26) and remote system N 28 (N being and integer) may receive calls via a network 30. The calls 24 may be directed at particular points in time such as a first call 24a directed at time t1 and a second call 24b directed at time t2.

According to the present invention, the calls 24a and 24b may invoke a remote command execution on the systems 26 and 28 and receive a response 32a and 32b (e.g., data, flags, status) after the occurrence of a network disruption 34. The network disruption 34 may occur, for example, at times t1' and t2' and may result from network connections being reset in response to the remote calls 24. Thus, the present invention does not rely on persistent network connections remaining available in order to complete remote command execution.

As will be described in more detail below, the calls 24 may be initiated in a rapid manner. This may be achieved, for example, by enabling a calling function (not shown) to return within the computer system 20 without waiting for remote execution to begin. In accordance with the present invention, an Event 36a and 36b may be configured by the computer system 20 to receive notification of when remote execution is complete—thereby enabling the computer 20 to perform other tasks. Furthermore, the Events 36a and 36b enable the computer system 20 to execute a plurality of commands in parallel without waiting for results from any particular command.

Upon completion of the remote commands, an Event Trigger 32a' and/or 32b' may be initiated as a portion of the responses 32a and 32b from the remote systems 26 and 28. The Event Triggers 32a' and 32b' provide notice to the computer system 20 of remote command completion by triggering the Events 36a and 36b. Since the Event Triggers 32a' and 32b' may provide notice to the computer system 20 after a potentially disruptive network communication 34 has occurred, remote command execution may still complete even if the network connections do not remain persistent. Thus, remote command performance is improved over conventional systems.

Figure 2:
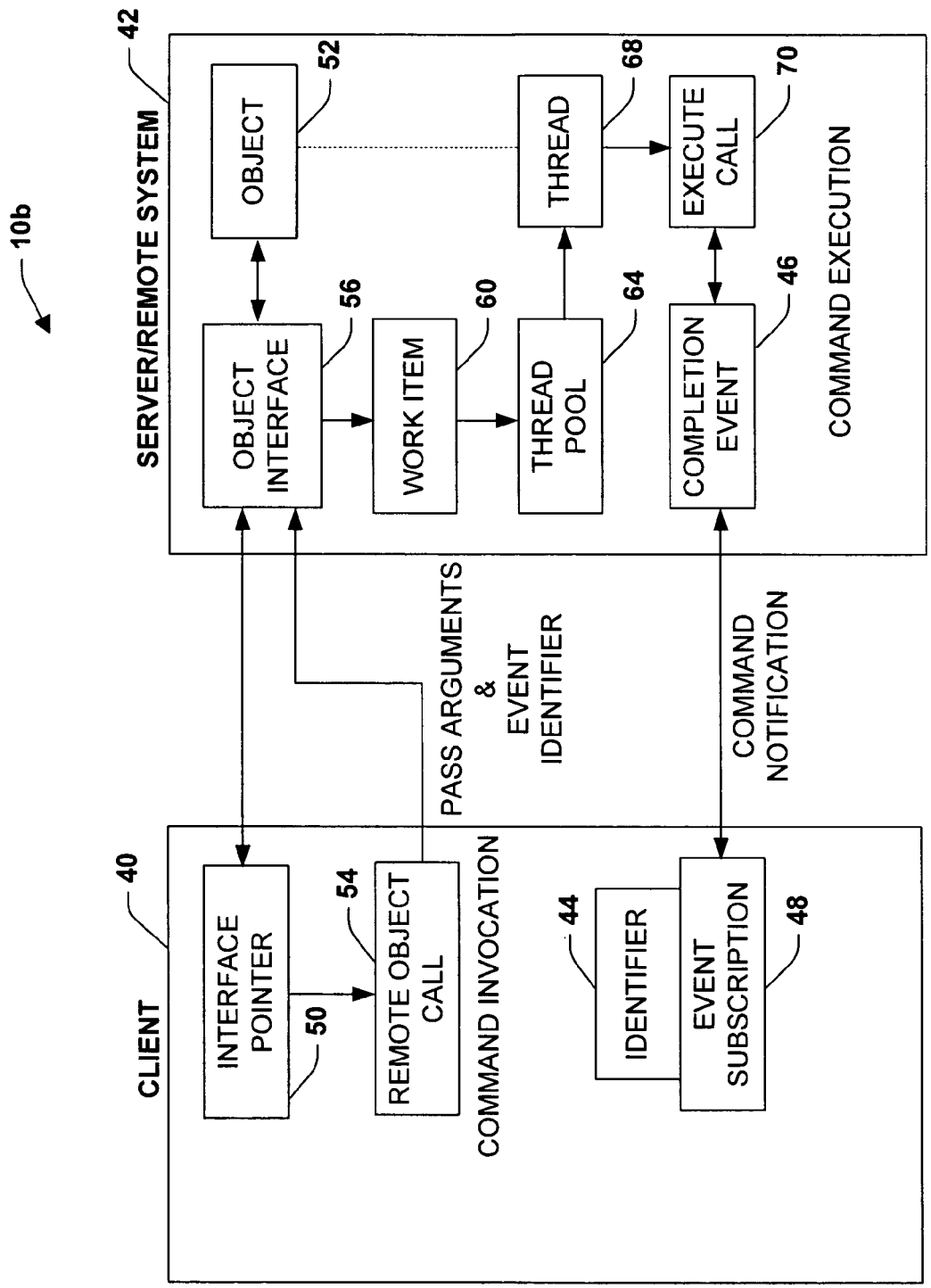
FIG. 2 is a schematic block diagram illustrating a system employing events and a distributed object architecture in accordance with one aspect of the present invention.

Turning now to FIG. 2, a client/server model 10b illustrates an exemplary system in accordance with an aspect of the present invention, wherein a client 40 initiates a remote command on a server 42 which may also be referred to as remote system 42. It is to be appreciated that a plurality of remote commands may be executed on a plurality of systems and that commands may also be directed from the server 42 to the client 40 and/or other systems (not shown).

Before executing a remote command, the client 40 may generate an identifier 44 for a completion event 46 that may be fired (e.g., triggered) when remote execution of a command completes. For example, the client 40 may configure an event subscription 48 (e.g., Windows Management Infrastructure (WMI) event) that may be triggered by the completion event 46. Furthermore, the event subscription 48 may also be employed to process the results of the remote command execution. The client 40 may then acquire an interface pointer 50 to an object 52 and invoke a remote object call 54 via an object interface 56. The remote object 52 may provide a data structure and object functions for carrying out remote command execution wherein the object interface 56 may provide access to the remote object 52. An exemplary object interface 56 is illustrated below.

```
Object Interface (e.g.,) IextensibleClusterCmd
{
a)   HRESULT Execute(  [in] BSTR bstrCLSID,   //CLSID of
component
                                              //implementing
desired functionality
b)                      [in] BSTR bstrEventServer,  //name of
server completion
                                              //event is to be
```

```
                                     -continued fired on
c)                      [in] BSTR bstrEventGuid,   //GUID of
completion event to fire
d)                      [in] BSTR bstrInputArg,    //input
argument to be passed to
                                                   //component
e)                      [in] BSTR bstrUser,        //username to
employ when calling
                                                   //component
f)                      [in] BSTR bstrDomain,      //domain for
bstrUser
g)                      [in] BSTR bstrPwd);        //password for
                                                   bstrUser
};
```

It is to be appreciated that the object interface 56 may be implemented via a distributed object architecture for communicating with remote objects (e.g., COM, DCOM, CORBA, etc.) The object interface 56 may include: an identification of the object 52 to be invoked (e.g., line (a) above), a name of a server on which the completion event 46 should be fired (e.g., line (b) above) [It is noted the name may generally be the same as the machine on which the client 40 is running, but need not be], the identifier 44 (e.g., line (c) above) to be attached to the completion event 46, the input argument (e.g., line (d) above) for the remote object 52 and/or security information (e.g., lines (e, f and g) above) specifying a user context the remote object 52 should be invoked as. As an example, a remote object call 54 may be invoked by the command IExtensibleClusterCmd::Execute( ) and passing the exemplary arguments described above in lines a through f. If the IExtensibleClusterCmd::Execute( ) returns successfully, the client 40 may release the interface pointer 50 and proceed to perform other work. The client may then be notified automatically via the event subscription 48 when and/or if remote execution completes.

After the remote object call 54 has been invoked, the remote system 42 may then proceed to perform remote execution of the command. Invoking a call to the object interface 56 on the remote system 42 may result in a work item 60 being queued to a thread pool 64 (e.g., via Windows NT 5 thread pool APIs) thereby enabling the call to return at once. The work item 60 may then be processed by a thread 68 from the thread pool 64. The object 52 with the requested identification parameter (e.g., specified in line a above) may then be instantiated by the thread 68 and queued for execution 70 via a work interface described below. The input argument (e.g., specified in line d above) may also be passed to the thread 68 for object execution. Below is an exemplary work interface for executing the remote object 52 in accordance with the present invention.

```
work interface (e.g.,) IClusterWork
{
        HRESULT Execute( [in] BSTR bstrInputArg,
                         [out] BSTR *pbstrOutputArg );
};
```

When the above work interface call returns, an HRESULT return status, together with the output argument from the call (e.g., in the pbstrOutputArg parameter) may be marshalled into the completion event 46 (e.g., of type ICEClusterActivity:the ActivityStatus property of the event 46 may be set to the HRESULT of calling IClusterWork:::Execute( )). An ActivityOutput property of the completion event 46 may also contain data returned in the pbstrOutputArg argument to the IClusterWork::Execute( ) with the event's ActivityGUID property set to the GUID parameter passed in the bstrEventGuid argument (e.g., line c above) in the call to the object interface 56. The completion event 46 may then be fired on the machine (e.g., the client 40) specified in the bstrEventServer argument (e.g., line b above). Since the completion event 46 may be fired after remote command execution, and hence any network disruption 34 is therefore likely complete, the present invention mitigates the problem faced by conventional remote invocation technologies that rely on persistent network connections.

The interfaces described above provide an advantageous extensibility mechanism to provide new system functionality. Extensibility may be achieved by employing an object that implements the work interface (e.g., IClusterWork), pass input data the work interface requires in the input argument parameter of the object interface and marshall the output data into the work interface output argument (e.g., pbstrOutputArg). In this manner, new functionality may be invoked on a remote machine by installing a component on the remote machine implementing the desired functionality and specifying the component as part of the method invocations described above.

Figure 3:
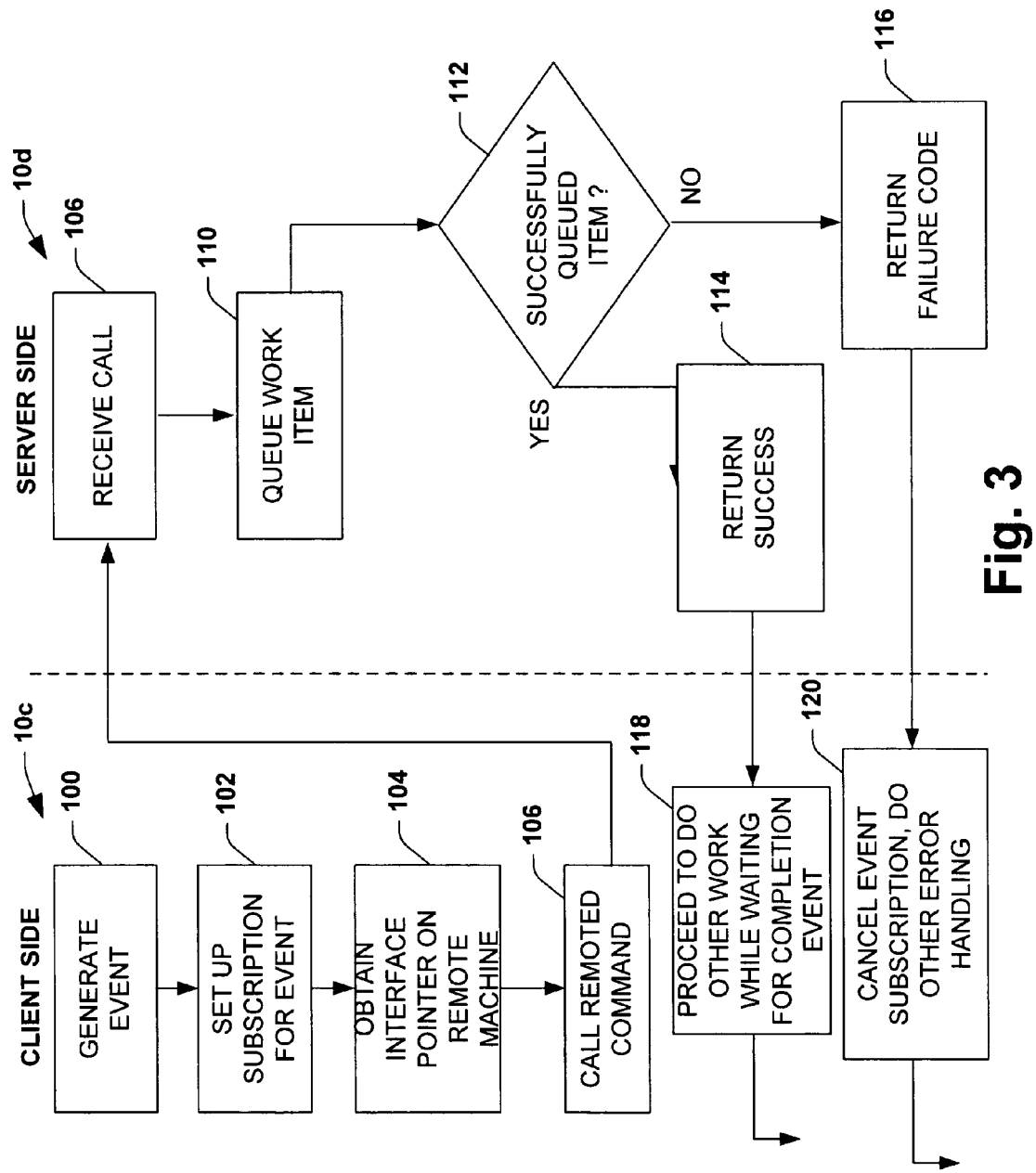
FIG. 3 is a flow chart diagram illustrating a methodology for client/server remote command execution in accordance with one aspect of the present invention.

Referring now to FIG. 3, a methodology illustrates a particular aspect of the present invention relating to parallel asynchronous command execution. Initial aspects of the command execution are depicted in relation to a client side execution 10c and a server side execution 10d. Particular aspects of the client and server side execution will be described in more detail below in relation to FIGS. 4 and 5.

At step 100, an event identifier may be generated by the client to associate a name for a server to respond after completion of the remote command execution. For example, a string may be employed associating an event with a GUID as described above in relation to line (c) of the object interface. At step 102, the client may configure an event subscription for receiving notice and results of completed and/or unsuccessful remote command execution. For example, the event subscription may be configured according to Microsoft's Windows Management Infrastructure (WMI). At step 104, an object interface pointer is obtained from the server wherein the client may be directed to a remote object providing the remote command execution. At step 106, the client invokes the remote command by calling the server and passing arguments (e.g., input buffers, names, identifiers) to the object interface described above.

Proceeding to step 108, the server receives the call and arguments generated by the client. At step 110, the server attempts to queue a work item for processing the received call from step 108. At step 112, a determination is made as to whether the work item was queued successfully (e.g., whether server has enough resources to process requested call). If the work item was queued successfully at step 112, the process proceeds to notify the client at step 114 (e.g., via a return success flag) and the process proceeds to step 118. If the work item was not queued successfully at step 112, the client may be similarly notified of a failure at step 116 and the process then proceeds to step 120. If the client was notified of the work item being queued successfully at step 118, the client may perform other tasks while waiting for the remote command to complete wherein the client may then be notified of completion via a completion event as described above. If the client was notified that a work item was not successfully queued at step 120, the subscription event described above may then be canceled and/or other processing may commence such as notifying a user of the unsuccessful attempt by the server to begin the requested work item.

Figure 4:
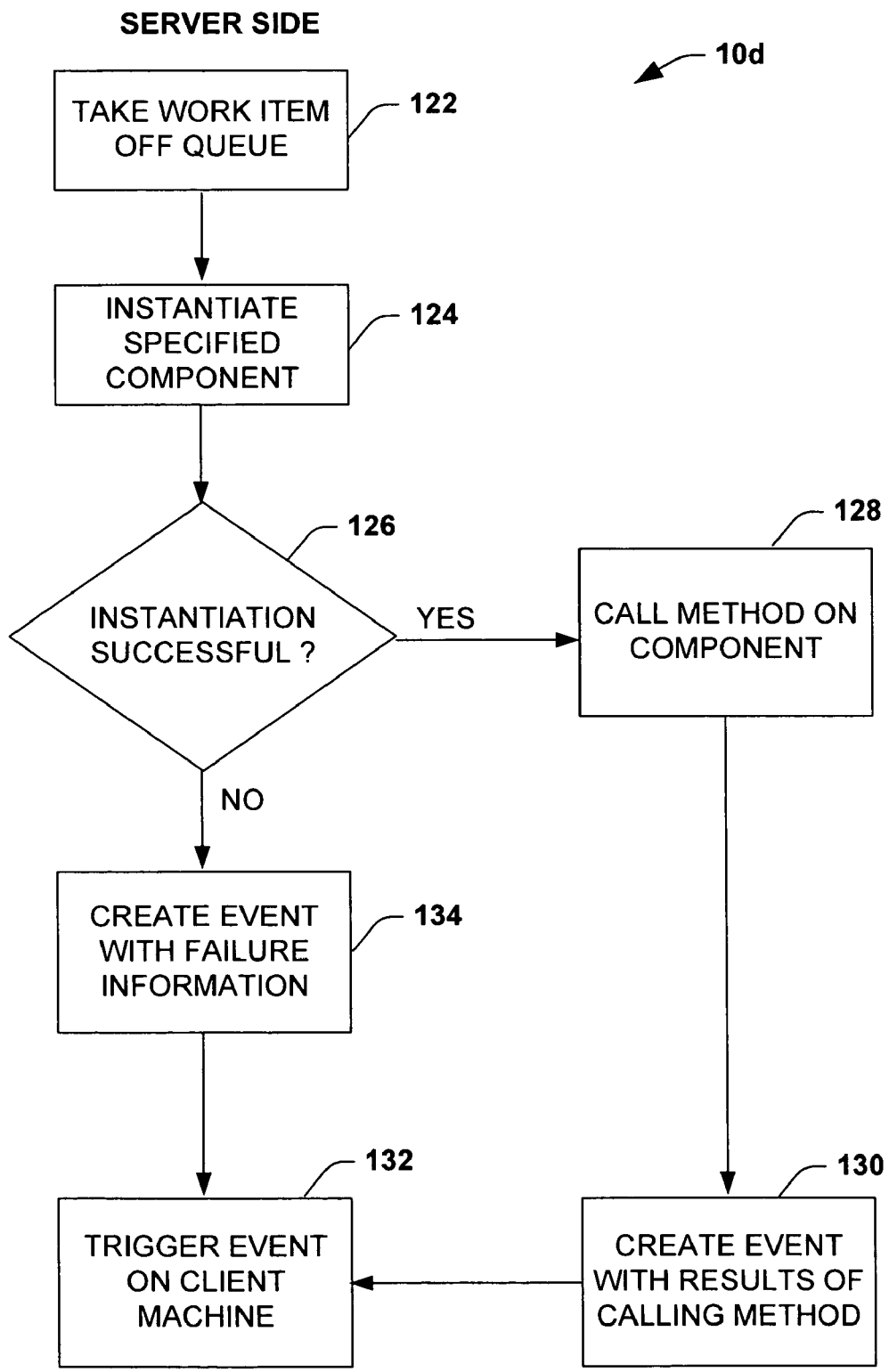
FIG. 4 is a flow chart diagram illustrating a methodology for server execution in accordance with one aspect of the present invention.

Turning now to FIG. 4, the server side methodology 10d illustrated in FIG. 3 is shown in more detail in relation to server side processing after a work item as been successfully queued in step 112. At step 122, the work item is taken off of the queue for processing (e.g., thread processing). At step 124, the object component specified in the remote command invocation described above is instantiated for further processing.

At step 126, a determination is made as to whether the instantiation of step 124 was successful. If instantiation was successful at step 126, the process proceeds to step 128 wherein a method is called to execute the object component functionality. At step 130, a completion event is created wherein results of the method execution are provided upon completion of the method execution. Upon completion, the completion event then triggers an event at step 132 to notify the client of the method completion and to provide the client with results of the method execution.

If instantiation was not successful at step 126 above, the process proceeds to step 134. At step 134, a completion event may be created wherein failure information of the unsuccessful object instantiation of step 126 is provided. The process then proceeds to step 132 wherein the client may be notified and provided with the failure information via the event trigger described above.

Figure 5:
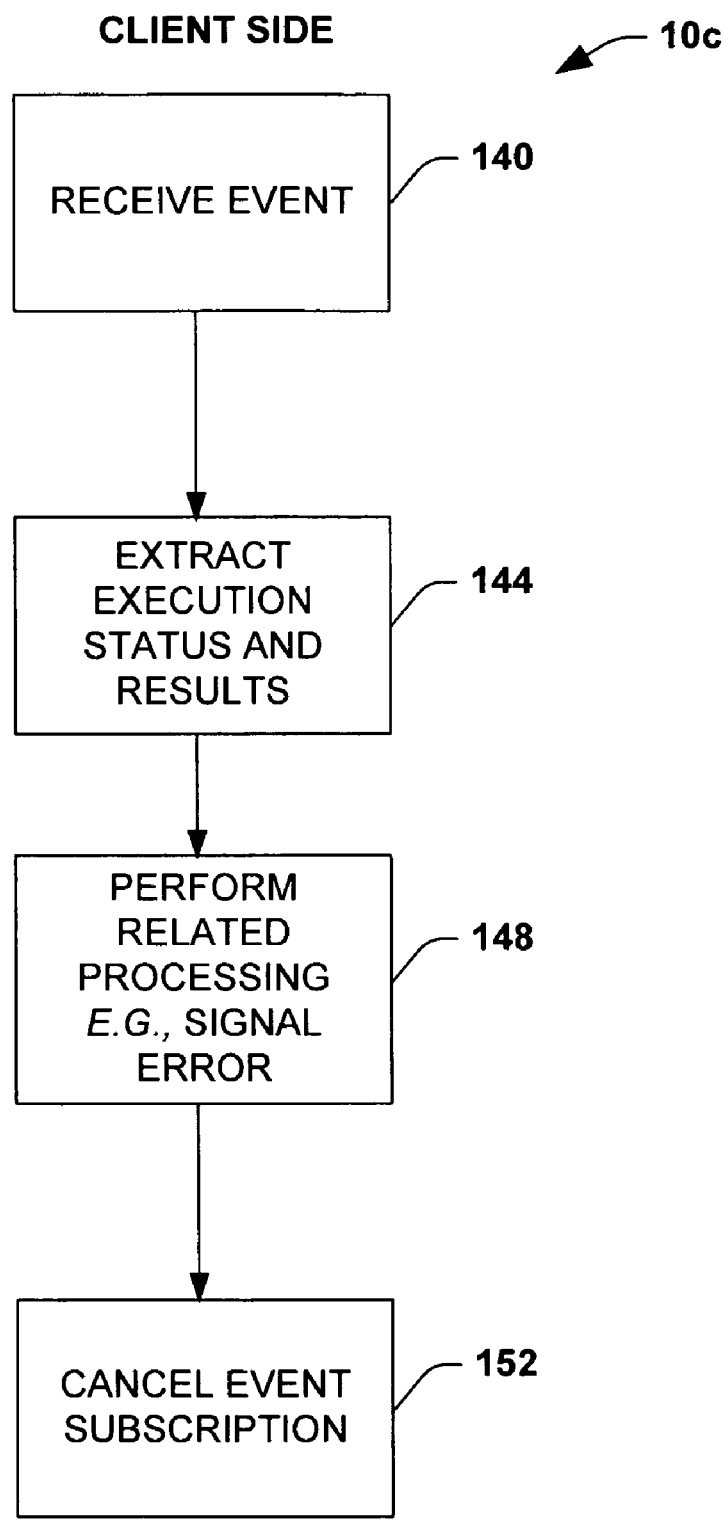
FIG. 5 is a flow chart diagram illustrating a methodology for client execution in accordance with one aspect of the present invention.

Now referring to FIG. 5, the client methodology illustrated in FIG. 3 is shown in more detail in relation to client side processing after steps 118 and/or step 120 wherein the server has caused the event configured in step 102 to complete. At step 140, the client is notified of the completed remote command execution via the subscription event configured at step 102 of FIG. 3. In this manner, the client may execute a plurality of remote asynchronous commands without waiting for completion of the commands on the remote machines. Moreover, since the client is notified after completion of the remote command, network disruptions that may affect conventional invocation technologies are mitigated. At step 144, the client may then extract execution status and results associated with the remote command execution. At step 148, the client may then perform related processing associated with the results and/or status of step 148. This processing may include, for example, signaling an error via a user interface if error results were obtained from step 134 of the server side execution. At step 152, the event subscription configured at step 102 may then be cancelled upon notification and results of the remote command execution.

Figure 6:
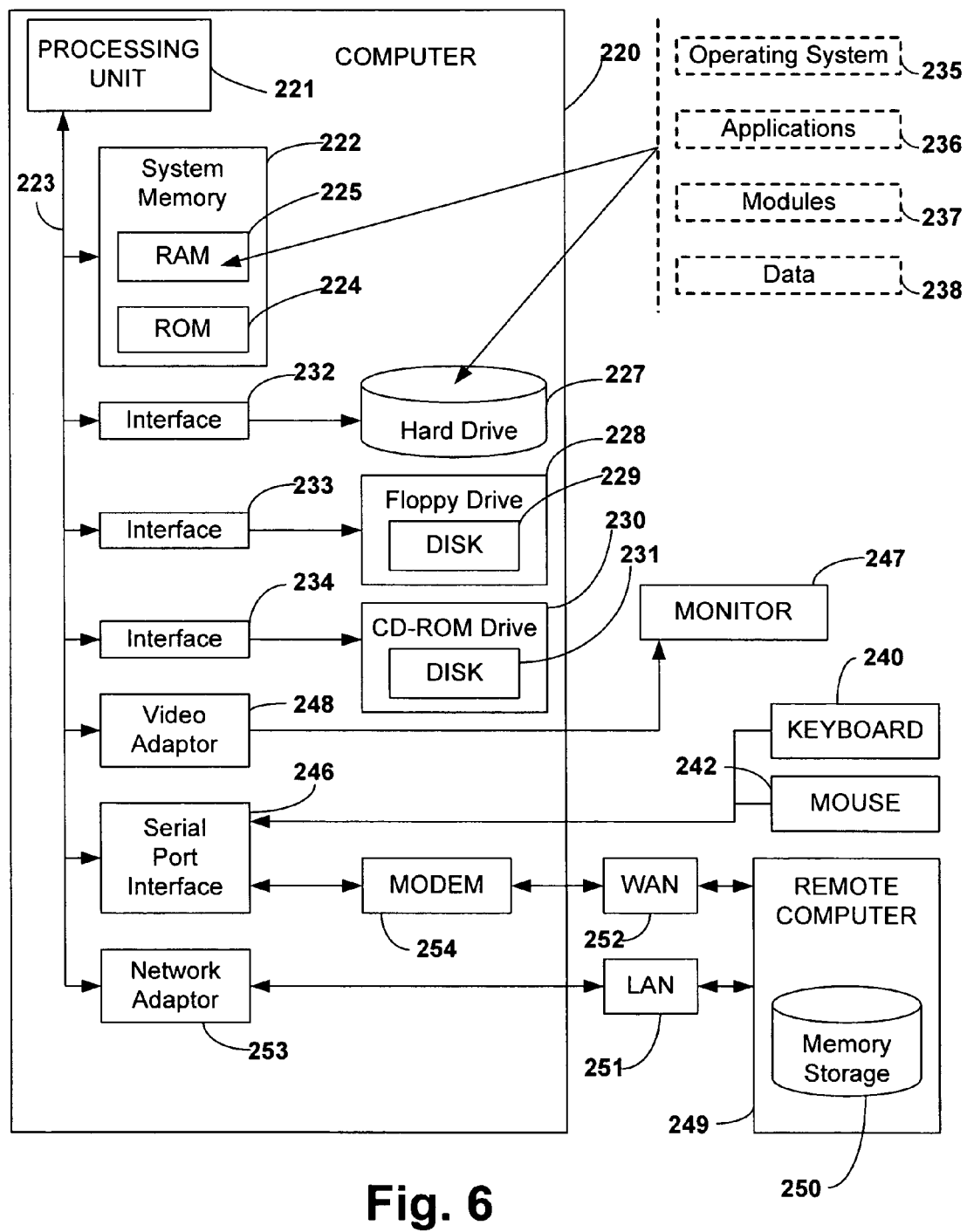
FIG. 6 is a schematic block diagram illustrating a system in accordance with one aspect of the present invention.

In order to provide a context for the various aspects of the invention, FIG. 6 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary system for implementing the various aspects of the invention includes a conventional server and/or client computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The server computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows operating system, NT server). It is to be appreciated that other operating systems may be employed (e.g., Unix operating system).

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The server computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 5. The logical connections depicted in FIG. 6 may include a local area network (LAN) 251 and a wide area network (WAN) 252. Such networking environments are commonplace in offices, enterprise-wide computer networks, intranets and the Internet.

When employed in a LAN networking environment, the server computer 220 may be connected to the local network 251 through a network interface or adapter 253. When utilized in a WAN networking environment, the server computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the server computer 220, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components and/or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claim

What is claimed is:

1. A system for parallel asynchronous command execution, comprising:
   a processor;

system memory; and a first computer system for directing one or more calls to invoke a plurality of remote procedures that are to be concurrently processed in parallel in a second computer system, the first computer and second computer communicating via a non-persistent connection, such that the remote procedures are executed without persistent handshaking between the first computer system and the second computer system, and wherein the first computer system, upon completion of at least one of the plurality of remote procedures, receives an event trigger generated by and transmitted from the second computer system, wherein the event trigger includes the remote procedure results for at least one of the plurality of remote procedures.

2. The system of claim 1 further comprising a distributed object architecture for communicating between the first computer system and the second computer system.

3. The system of claim 2 wherein the distributed object architecture is implemented via at least one of component object model (COM), distributed component object model (DCOM), and common object request broker architecture (CORBA) interface languages.

4. The system of claim 1 wherein the first computer system configures an event to receive the remote procedure results from the second computer system.

5. The system of claim 4 wherein the event is a Windows Management Infrastructure event.

6. The system of claim 4 wherein the event is provided with an identifier for enabling the second computer system to notify the first computer system.

7. The system of claim 1 further comprising a work item and a thread for processing the remote procedure.

8. The system of claim 1 further comprising a completion event on the second computer system for notifying the first computer system.

9. The system of claim 1 further comprising an object interface for providing remote access between the first computer system and the second computer system.

10. The system of claim 9 wherein the object interface further includes an identification for a remote object.

11. The system of claim 9 wherein the object interface further includes a computer name for identifying where to trigger an event.

12. The system of claim 9 wherein the object interface further includes an identification for an event for the second computer system to trigger.

13. The system of claim 9 wherein the object interface further includes an input argument for providing results from the remote procedure.

14. The system of claim 9 wherein the object interface further includes at least one of a username, domain, and password for specifying a user context for the remote procedure.

15. The system of claim 1 wherein the second computer system further comprises a work interface for executing the remote procedure.

16. The system of claim 15 wherein the work interface further comprises an input argument and an output argument.

17. A system for parallel asynchronous command execution, comprising:

a processor;

system memory;

a first computer system for performing the following:

directing one or more calls to invoke a plurality of remote procedures that are to be concurrently processed in parallel in at least one other computer system;

upon completion of at least one of the plurality of remote procedures, receives an indication indicating that a non-persistent connection is to be established between the first computer system and the at least one other computer system;

determines that the connection between the first computer system and the at least one other computer system was disrupted after sending the one or more calls to the at least one other computer system; and receives an event trigger generated by and transmitted from the at least one other computer system, wherein the event trigger includes the remote procedure results for at least one of the plurality of remote procedures.

18. A method for parallel asynchronous command execution, comprising the steps of:

directing at least one call from a first computer system to invoke a plurality of remote procedures that are to be concurrently processed in parallel in at least one other computer system, such that the remote procedures are executed without persistent handshaking between the first computer system and the second computer system;

establishing a non-persistent connection between the first computer system and the at least one other computer system upon completion of the remote procedure; and generating an event trigger and transmitting the event trigger to the first computer system, wherein the event trigger includes the remote procedure results for at least one of the plurality of remote procedures.

19. The method of claim 18 further comprising the step of communicating between the first computer system and the at least one other computer system via a distributed object architecture.

20. The method of claim 19 wherein the distributed object architecture is implemented via at least one of COM, DCOM, and CORBA interface languages.

* * * * *